United States Patent
Bjørn et al.

(10) Patent No.: US 11,525,433 B2
(45) Date of Patent: Dec. 13, 2022

(54) POWER RAMP RATE CONTROL

(71) Applicant: VESTAS WIND SYSTEMS A/S, Aarhus N (DK)

(72) Inventors: Hans Kristian Bjørn, Randers SØ (DK); Jan Vestergaard Knudsen, Risskov (DK); Sanka Saibabu, Andhrapradesh (IN)

(73) Assignee: VESTAS WIND SYSTEMS A/S, Aarhus N. (DK)

( * ) Notice: Subject to any disclaimer, the term of this patent is extended or adjusted under 35 U.S.C. 154(b) by 191 days.

(21) Appl. No.: 16/957,008

(22) PCT Filed: Nov. 20, 2018

(86) PCT No.: PCT/DK2018/050304
§ 371 (c)(1),
(2) Date: Jun. 22, 2020

(87) PCT Pub. No.: WO2019/120399
PCT Pub. Date: Jun. 27, 2019

(65) Prior Publication Data
US 2020/0340449 A1 Oct. 29, 2020

(30) Foreign Application Priority Data
Dec. 21, 2017 (IN) .............. 201711046040

(51) Int. Cl.
*F03D 7/04* (2006.01)
*F03D 7/02* (2006.01)
*H02J 3/38* (2006.01)

(52) U.S. Cl.
CPC ........... *F03D 7/048* (2013.01); *F03D 7/0284* (2013.01); *H02J 3/381* (2013.01);
(Continued)

(58) Field of Classification Search
CPC .................. F03D 7/0284; F03D 7/048; F05B 2270/1033; F05B 2270/309; F05B 2270/335
See application file for complete search history.

(56) References Cited

U.S. PATENT DOCUMENTS

| | | | |
|---|---|---|---|
| 2006/0132993 A1* | 6/2006 | Delmerico | F03D 7/048 361/20 |
| 2010/0145533 A1* | 6/2010 | Cardinal | H02J 3/48 700/291 |

(Continued)

FOREIGN PATENT DOCUMENTS

| | | |
|---|---|---|
| CN | 102013699 A | 4/2011 |
| CN | 102067407 A | 5/2011 |

(Continued)

OTHER PUBLICATIONS

Jianxiao Zou, Junping Yao, Qingze Zou and Hongbing Xu, "A Multi-Objective Optimization Approach to Active Power Control Of Wind Farms," 2012 American Control Conference, Jun. 27-Jun. 29, 2012, 6 pages.

(Continued)

*Primary Examiner* — Gary Collins
(74) *Attorney, Agent, or Firm* — Patterson + Sheridan, LLP

(57) ABSTRACT

Regulating a power ramp rate of a wind park at a point of common coupling (PCC) between the wind park and a utility grid. The method comprises receiving a power reference for the wind park; determining the power ramp rate of the wind park as a function of the power output of each individual wind turbine in the park, wherein the power ramp rate of the wind park is based on the power ramp rates of the individual wind turbines and determining a corresponding plurality of power set-points for each wind turbine based on the power ramp rates and power reference. The corresponding plurality (Continued)

of power set-points is dispatched to the plurality of wind turbines for regulating the power ramp rate of the wind park in dependency of the power ramp rates of the plurality of wind turbines.

12 Claims, 4 Drawing Sheets

(52) U.S. Cl.
CPC . *F05B 2270/1033* (2013.01); *F05B 2270/309* (2013.01); *F05B 2270/335* (2013.01); *H02J 2300/28* (2020.01)

(56) References Cited

U.S. PATENT DOCUMENTS

| | | | |
|---|---|---|---|
| 2011/0153099 | A1 | 6/2011 | Garcia |
| 2011/0175353 | A1* | 7/2011 | Egedal ............... F03D 7/043 290/44 |
| 2012/0200086 | A1 | 8/2012 | Kang et al. |
| 2017/0298905 | A1 | 10/2017 | Park et al. |
| 2017/0328342 | A1* | 11/2017 | Kjær ............... H02P 9/105 |

FOREIGN PATENT DOCUMENTS

| | | |
|---|---|---|
| CN | 102635498 A | 8/2012 |
| CN | 102748219 A | 10/2012 |
| CN | 102852721 A | 1/2013 |
| CN | 104271942 A | 1/2015 |
| CN | 107023434 A | 8/2017 |
| DE | 102008047667 A1 | 3/2010 |
| EP | 1672779 A2 | 6/2006 |
| EP | 2541053 A1 | 1/2013 |
| JP | H1169631 A | 3/1999 |
| WO | 2010000663 A1 | 1/2010 |
| WO | 2019120399 A1 | 6/2019 |

OTHER PUBLICATIONS

PCT Notification of Transmittal of the International Search Report and the Written Opinion of the International Searching Authority, or the Declaration for Application No. PCT/DK2018/050304 dated Feb. 21, 2019.
English Translation of the First Office Action for Chinese Application: 201880078466.X, dated Jul. 2, 2021.
European Patent Office, Communication Pursuant to Article 94(3) EPC for Application 18 811 437.5-1002 dated Jul. 20, 2022.

\* cited by examiner

POWER RAMP RATE CONTROL

FIELD OF THE INVENTION

The present invention relates to regulating a power ramp rate (PRR_PCC) of a wind park at a point of common coupling (PCC) between the wind park and a utility grid.

BACKGROUND OF THE INVENTION

Power plants comprise energy production units for generating power. The power is normally fed into a utility grid, where users are connected and consume the power. The utility grid is also called the transmission system, power grid, electrical grid or simply the grid, it interconnects power plants, which produce power, with consumers such as buildings and homes.

Power plants may be in the form of renewable power plants comprising wind turbines and/or solar cells (photovoltaic cell). A wind park is a power plant comprising a plurality of wind turbines. The power plants are normally controlled to deliver a certain amount of power according to a power reference at the Point of Common Coupling (PPC) between the power plant and the utility grid. At the Point of Common Coupling (PCC) the power ramp rate of the power fed into the utility grid, among others, should be controlled to be within the limits specified e.g. by a grid code or the utility grid operator. A power ramp rate of a wind park is defined as the wind parks ability to change its power output over time, $\Delta P/\Delta t$, where P is the output power of the wind park and t is the time.

In the following, wind power plant, wind farm, wind park or a wind turbine park are intended to have the same meaning. Wind turbine generators are also known simply as turbines, wind turbines or WTGs. Control of the ramp rate is intended to have the same meaning as to regulate the ramp rate.

A conventional wind park comprise a plurality of wind turbines delivering electricity to an internal network, which is connected to the utility grid at the point of common coupling. The wind turbines operate and deliver power in accordance with set points defining electrical properties that the turbine should comply with. In an example, the set point may be an active power, reactive power, current and/or voltage set point. The set points may be determined and dispatched from a power plant controller (PPC) which is a central unit, which determines and dispatches set points to the plurality of wind turbines. The set points may be determined based on a reference, defining the electrical properties which the wind park should comply with. The utility grid is operated by a transmission system operator (TSO) (also called a grid operator).

Power ramp demands originating from grid codes or a grid operator, may be in conflict with protection of the mechanical components of wind turbines. Tower oscillations may be excited if a wind turbine follows a request to ramp the active power with large amplitude and high ramp rate as well as undesired variations in the produced power. Tower oscillations may reduce the lifetime of the wind turbine and should therefore be avoided as much as possible. As grid codes may set higher requirements to wind turbine's ability to change power from one set-point to another set-point, the structural requirements, e.g. in terms of the mechanical strength of the tower and/or other wind turbine components, may increase. WTGs are in some cases limited in fulfilling these ramp request either in speed (pu/s) or size (pu), especially when operating at low power output. When operating at low power output, the rotor of the wind turbine may have low rotational energy due to a low rotational speed of the rotor and low inertia. The low rotational speed means that the turbine cannot ramp up very fast as it requires a build-up of inertia in the rotor, which is achieved by having a higher rotational speed of the rotor. Thus, the ramp rate of a wind turbine with low power output is normally a lot smaller than a turbine operating at a higher power output. At the desired power output, the turbines may individually be operated with a high rotor speed in order to achieve a higher ramp rate, however this is highly undesirable as it will lead to substantially higher loads on the drivetrain.

Accordingly, there is a need to improve the regulating of power ramp rate of the power output of a wind park. Particularly, there is a need to improve the regulating of the power ramp rate at the PCC of a wind farm, comprising a plurality of wind turbines.

OBJECT OF THE INVENTION

It is an object of the invention to improve the regulating of a power ramp rate of a wind park, particularly to improve the regulating of power ramp rate at a point of common coupling (PCC) between the wind park and a utility grid.

In general, the invention preferably seeks to alleviate or eliminate one or more of the above-mentioned disadvantages relating to known systems for regulating power ramp rates. In particular, it may be seen as an object of the present invention to provide a method that solves the above mentioned problems relating to power ramp rates, or other problems, of the prior art.

SUMMARY OF THE INVENTION

In a first aspect of the invention there is provided a method for regulating a power ramp rate of a wind park at a point of common coupling (PCC) between the wind park and a utility grid, wherein the wind farm comprises a plurality of wind turbines each having a power ramp rate dependent on a power output of the respective wind turbine, the method comprising
  receiving a power reference for the wind park,
  determining the power ramp rate of the wind park as a function of the power output of each individual wind turbine, wherein the power ramp rate of the wind park is based on the power ramp rates of the individual wind turbines, and
  determining a corresponding plurality of power set-points for said plurality of wind turbines based on the power ramp rates of said plurality of wind turbines and power reference for the wind park,
wherein said corresponding plurality of power set-points is dispatched to said plurality of wind turbines for regulating said power ramp rate of the wind park in dependency of the power ramp rates of said plurality of wind turbines. Advantageously, determining a plurality of power set-points for a corresponding plurality of wind turbines based on the power ramp rates of the plurality of wind turbines and power reference for the wind park, and subsequently dispatching the power set points to the plurality of wind turbines, provides a reliable method for ensuring control of the power ramp rate of the wind farm, and utilizing the capability of the WTGs operating as a plant.

Preferably, the dispatched power set-points ensures that the power output from the power plant is substantially equal to the power reference for the wind park. Thus, the PPC may compensate for losses in the power lines from the wind turbines to the PCC.

Thus, a Power Plant Controller PPC may be used for controlling the ramp rate of the power output of the wind park. This can be done by dispatching different power set points to the wind turbines and then utilize that the turbines with the highest power output also have the highest ramp rate, thereby give an overall higher ramp rate for the wind park. For example, it may be more beneficial to fully stop some of the wind turbines to allow the remaining to operate at higher power output, hereby maintaining a high ramp rate. This is contrary to prior art, where the same power set-point is sent to all wind turbines which result in a relatively low ramp rate.

According to a first embodiment, a first subset of wind turbines within the plurality of wind turbines may operate at a higher power output than a second subset of wind turbines within the plurality of wind turbines. Preferably, a third subset of wind turbines within the plurality of wind turbines may operate at a lower power output than a fourth subset of wind turbines within the plurality of wind turbines, and/or a fifth subset of wind turbines within the plurality of wind turbines may be shut down.

According to a second embodiment, the first subset of wind turbines are operated, on average, at 10%, preferably 20%, more preferably 30%, higher power output than the second subset of wind turbines.

According to a third embodiment, the fourth subset of wind turbines are operated, on average, at 10%, preferably 20%, more preferably 30%, lower power output than the third subset of wind turbines.

According to a fourth embodiment, the second subset of wind turbines are operated, on average, at 10%, preferably 20%, more preferably 30%, higher or equal power output than the fourth subset of wind turbines.

Advantageously, the effect of ramping the subsets of WTGs according to the first, second, third and fourth embodiment, is to regulate the combined ramp capacity of the WTGs operating in a plant. Thus, by lowering the set point on specific WTGs in a plant and increasing it on other, the total available ramping capacity may increase.

The ramp rate of the wind turbines is dependent on the power output of the turbines such that the ramp rate is relative low at low power output and increases as the power output goes towards rated power. This means that the wind park may not be able to provide the required ramp rate when operating derated. This problem is solved by embodiments of the present invention, and in the same time ensuring that the WTGs deliver the power required by the operator.

According to another embodiment, the determining of the power ramp rate of the wind park at the point of common coupling (PCC) and/or the power ramp rates of the individual wind turbines at an output terminal of each of the wind turbines, comprises measuring one or more of, reactive power, active power, voltage, current, power factor at the point of common coupling and/or at the output terminal of each of the wind turbines.

According to yet another embodiment, the determined power ramp rate of the wind farm and/or the power ramp rates of the individual wind turbines are based on an analysis of the measured voltage and/or current at the point of common coupling (PCC) and/or at the output terminal of the wind turbines.

According to an embodiment, the plurality of power set-points may be arranged for controlling rotor speed of the plurality of wind turbines, so as to regulate the power ramp rate of the plurality of wind turbines.

A second aspect of the invention relates to a power plant controller (PPC) configured to perform a method for regulating a power ramp rate of a wind park at a point of common coupling (PCC) between the wind park and a utility grid, wherein the wind farm comprises a plurality of wind turbines each having a power ramp rate dependent on a power output of the respective wind turbine, the method comprising receiving a power reference for the wind park, determining the power ramp rate of the wind park as a function of the power output of each individual wind turbine, wherein the power ramp rate of the wind park is based on the power ramp rates of the individual wind turbines, and determining a corresponding plurality of power set-points for said plurality of wind turbines based on the power ramp rates of said plurality of wind turbines and power reference for the wind park, wherein said corresponding plurality of power set-points is dispatched to said plurality of wind turbines for regulating said power ramp rate of the wind park in dependency of the power ramp rates of said plurality of wind turbines.

In the present context, a number of terms are used in a manner being ordinary to the skilled person. Some of these terms are detailed below:

P is preferably used to mean/denote active power.

Q is preferably used to mean/denote reactive power.

WTG is preferably used to mean/denote Wind turbine (Wind Turbine Generator).

PPC is preferably used to mean/denote Power Plant Controller.

STATCOM is preferably used to mean/denote Static Synchronous Compensator.

MUS is preferably used to mean/denote Mechanical Switch Unit.

ES is preferably used to mean/denote Energy Storage.

WPP is preferably used to mean/denote Wind Park (Wind Power Plant)

BRIEF DESCRIPTION OF THE FIGURES

The figures show one way of implementing the present invention and is not to be construed as being limiting to other possible embodiments falling within the scope of the attached claim set.

DETAILED DESCRIPTION OF AN EMBODIMENT

Figure 1:
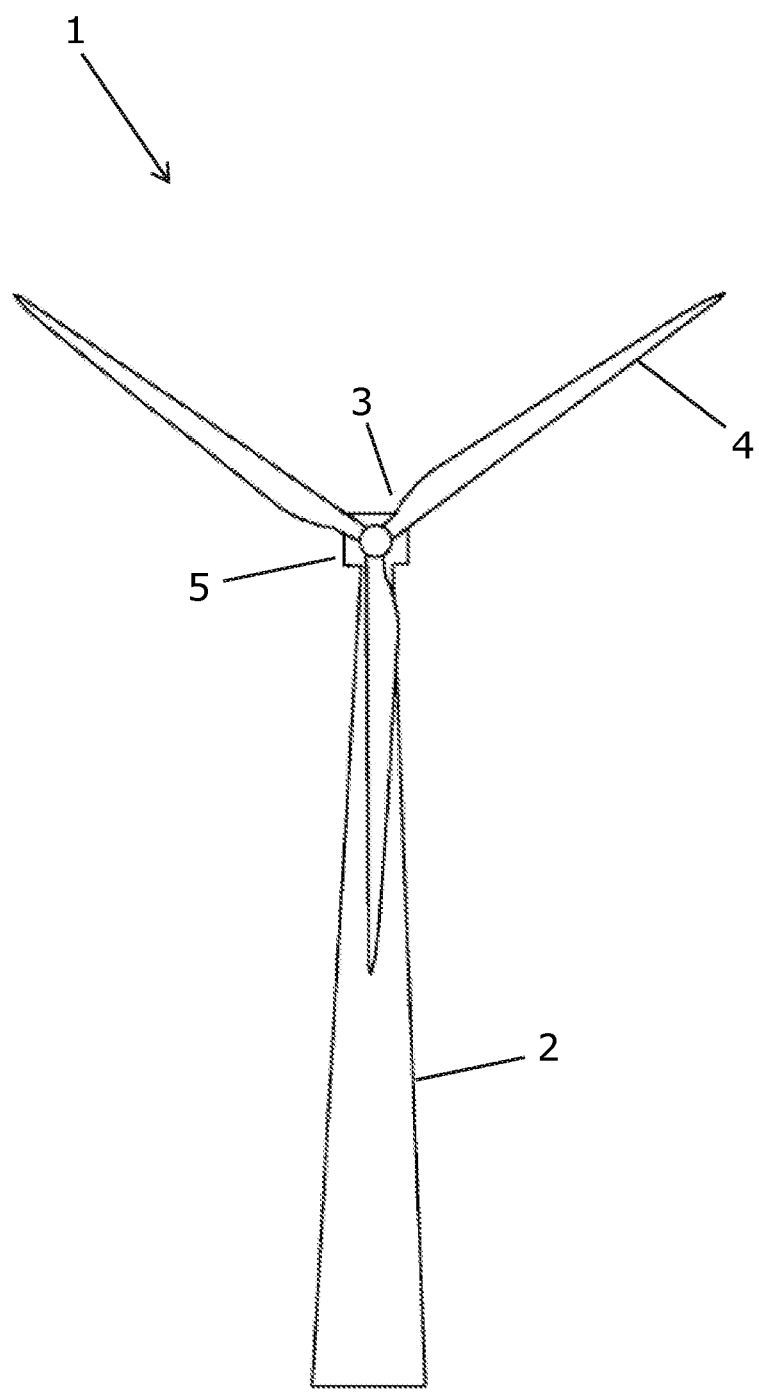
FIG. 1 schematically illustrates a wind turbine.

FIG. 1 shows a wind turbine WTG 1 comprising a tower 2 and a rotor 3. The rotor comprises three rotor blades 4. However, the number of blades may vary, and there may be two, four or even more blades. The rotor 3 is connected to a nacelle 5, which is mounted on top of the tower 2, and is arranged to drive an electrical generator situated inside the nacelle. The rotor 3 is rotatable by action of the wind. The wind-induced rotational energy of the rotor blades 4 is transferred via a shaft to the electrical generator. Thus, the WTG 1 is capable of converting kinetic energy of the wind into mechanical energy by means of the rotor blades 4 and, subsequently, into electric power by means of the electrical generator. The electrical layout of the WTG 1 may in addition to the electrical generator include a power converter. The power converter is connected in series between the electrical generator and the electrical grid for converting the variable frequency generator AC power into a grid frequency AC power to be injected into the utility/electrical grid. The electrical generator is via the power converter controllable to produce a power corresponding to a power request. Here the WTG can be, but not limited to, a full scale turbine or a double fed induction generator turbine (DFIG).

The blades 4 can be pitched in order to alter the aerodynamic properties of the blades, e.g. in order to maximize uptake of the wind energy. The blades 4 are pitched by a pitch system, which includes actuators for pitching the blades dependent on a pitch request.

A WTG is, in normal operation, set to capture as much power from the wind, at any given wind speed. This works as long as the power production is below the rated power limit for the wind turbine, i.e. partial load operation. When the wind speed increases above rated wind speed, often designed at 10-12 m/s, the WTG has to pitch the blades 4, so the energy captured is stable at rated power, even if the wind is well above rated wind speed.

Figure 2:
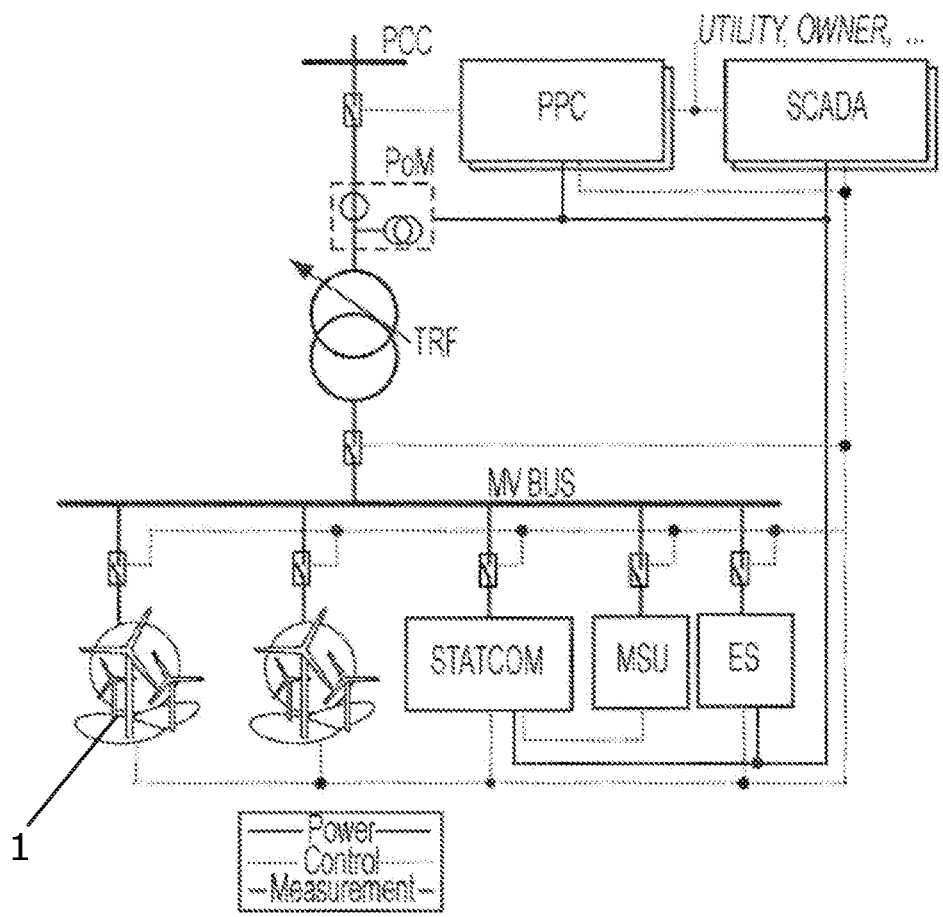
FIG. 2 schematically illustrates a generic wind power plant architecture.

A wind power plant WPP (also known as a wind park) comprises a plurality of WTGs controlled by a power plant controller PPC and interconnection infrastructure. FIG. 2 shows an example of a generic WPP architecture with a plurality of WTGs, a collection grid with a MV collection bus, a transformer TRF. At the high voltage side of the transformer there is a Point of Measurement PoM, close to the Point of Common Coupling PCC. Between the PCC and the TRF a power plant circuit breaker or a switch gear is installed and is operated by the PPC, in order for system operators to disconnect the WPP from the grid.

From the WTGs to the PCC there may be several electrical infrastructure components, e.g. power cables etc. All the components are needed, but they contribute to losses from the WTGs to the PCC. Losses which have to be taken into account when controlling the WPP.

The measurements obtained at the PoM are communicated to the PPC and optionally also to a SCADA system. The SCADA is optional and is not necessarily interacting with embodiments of the present invention. Based on the measurements, the PPC controls the WTGs accordingly. Further optional equipment is also shown, such as a STATCOM, MSU (Mechanically Switched Unit, wherein the unit can be either capacitors or inductors), ES (Energy Storage) all used for improving power quality and stability.

In an embodiment the Power Plant Controller PPC has the responsibility to control active power P and reactive power Q at the point of common coupling with the utility grid. The P and Q quantities are the means by which other system parameters can be influenced, such as the grid frequency f and voltage V. The controller structure has as inner loops the P and Q control, and has as outer loops the f and V control.

Besides the core functionalities described above, the PPC may also be responsible for other WPP functionalities, required either by the Transmission System Operator TSO or by the WPP owner.

The active power control loop is responsible for controlling P at the point of common coupling. This inner loop can be used to influence the grid frequency, by adding appropriate external control loops (e.g. primary frequency regulation and fast frequency response). Power oscillation damping can be achieved as well by adding an appropriate external control loop.

Figure 3:
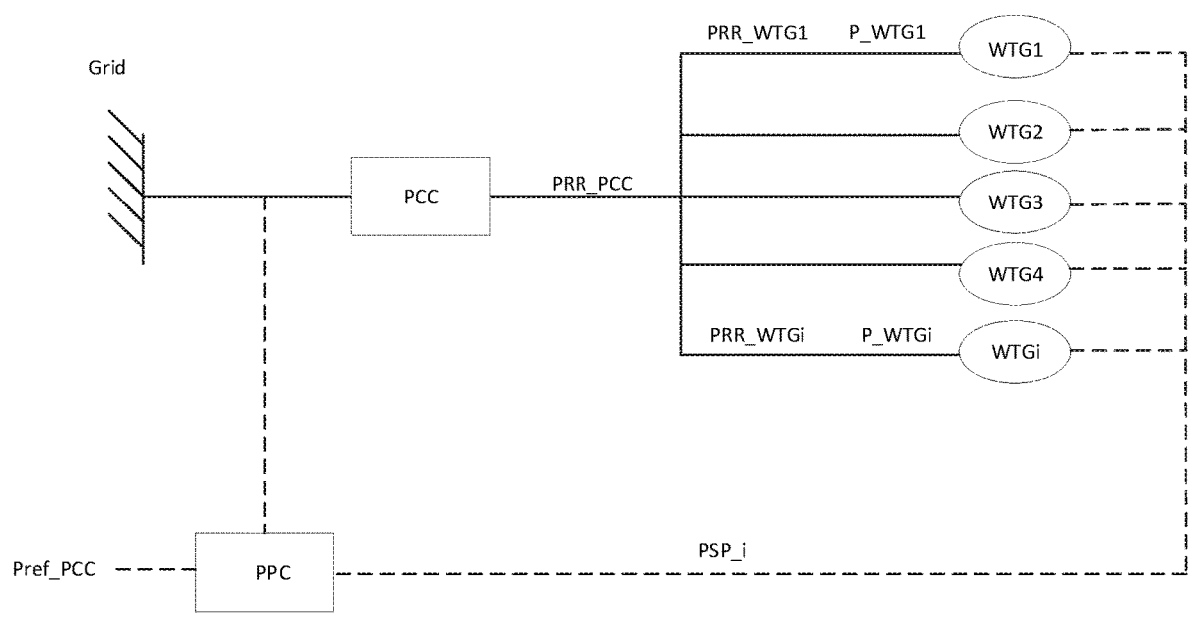
FIG. 3 schematically illustrates a wind park and a power plant controller PPC, configured for performing a method for regulating a power ramp rate of the wind park at the point of common coupling.

FIG. 3 shows a general concept for regulating a power ramp rate PRR_PCC of a wind park at a point of common coupling PCC according to the present invention. The power ramp rate PRR_PCC of the wind park is defined as the available range of change of power of the plurality of wind turbine generators WTGi at a point of common coupling PCC.

In FIG. 3 a wind farm comprising wind turbines WTG1; WTG2 . . . WTGi is disclosed. In the illustrative example in FIG. 3, the method according to the present invention regulates the ramp rate of the plurality of wind turbines WTG1; WTG2 . . . WTGi disclosed in FIG. 3, however the method may in another embodiment regulate a ramp rate of a subset of the plurality of WTGs shown in FIG. 3, e.g. the subset being WTG1, WTG2 and WTG3. The embodiment in FIG. 3 show one way of implementing the present invention and is not to be construed as being limiting to other possible embodiments falling within the scope.

In FIG. 3, the wind turbines WTG1; WTG2 . . . WTGi each has a power ramp rate PRR_WTGi dependent on a power output P_WTGi of the respective wind turbine. The method receives a power reference $P_{REF}$_PCC for the wind park, from a grid operator e.g.

The method determines the power ramp rate PRR_PCC of the wind park as a function of the power output P_WTGi of each individual wind turbine WTGi. The power ramp rate PRR_PCC of the wind park is based on the power ramp rates PRR_WTGi of the individual wind turbines.

By measuring one or more of, reactive power, active power, voltage, current, power factor at the point of common coupling PCC and/or at the output terminal of each of the wind turbines, the method determines the power ramp rate PRR_PCC of the wind park at the point of common coupling PCC and/or the power ramp rates PRR_WTGi of the individual wind turbines at an output terminal of each of the wind turbines.

Based on an analysis of the measured voltage and/or current at the point of common coupling PCC and/or at the output terminal of the wind turbines, the method determines the power ramp rate PRR_PCC of the wind farm and/or the power ramp rates PRR_WTGi of the individual wind turbines.

Further, the method determines a corresponding plurality of power set-points PSP_i for the plurality of wind turbines WTGi based on the power ramp rates PRR_WTGi of the plurality of wind turbines and power reference $P_{REF}$_PCC for the wind park. The corresponding plurality of power set-points PSP_i is dispatched to the plurality of wind turbines WTGi for regulating the power ramp rate PRR_PCC of the wind park in dependency of the power ramp rates PRR_WTGi of the plurality of wind turbines (the dispatching signal with the power set-points PSP_i is illustrated with a dashed line in FIG. 3)

The power set-point PSP_i is arranged for controlling one or more electrical characteristic EC_WTGi of at least one of the wind turbine generators WTGi, and is determined and dispatched by the PPC.

The electric characteristic EC_WTGi controlled of at least one of the wind turbine generators WTGi may include generator torque and/or generator rotor speed.

Differently from prior art, a method according to present invention comprise the step of having the PPC also controlling rotor speed for each turbine.

By differentiating the rotor speed to increase the stored rotating energy for the wind park, but maintaining the required power output of the wind park, a faster ramp rate for the combined wind park is ensured. When controlling the rotor speed the operator may also state the wind park ramp rate capabilities.

In another embodiment, the method according to the present invention may regulate the power ramp rate of the plurality of wind turbines, by actively controlling subsets of the WTGs:

A first subset of wind turbine generators WTGi within the plurality of wind turbines is operated at a higher power output P_WTGi than a second subset of wind turbines WTGi within the plurality of wind turbines, and a third subset of wind turbine generators WTGi within the plurality of wind turbines is operated at a lower power output P_WTGi than a fourth subset of wind turbines WTGi within the plurality of wind turbines, and/or a fifth subset of wind turbines WTGi within the plurality of wind turbines are shut down.

The present invention solves the problem that wind power plants may not be able to have a sufficiently high ramp rate when operating at low output power. The ramp rate of the wind turbines is dependent on the power output of the wind turbines such that the ramp rate is relative low at low power output and increases as the power output goes towards rated power. The wind park may not be able to provide the required ramp rate when operating derated. The solution is to actively control a number of wind turbines in the wind park to operate at a higher power output and thus also provide a higher ramp rate and then have a number of other wind turbines derate or even shut down in order to deliver the required power. The method may regulate a power ramp rate of the wind park, so the first subset of wind turbines are operated, on average, at 10%, preferably 20%, more preferably 30%, higher power output than the second subset of wind turbines.

In another embodiment the method may regulate a power ramp rate of the wind park, so the fourth subset of wind turbines are operated, on average, at 10%, preferably 20%, more preferably 30%, lower power output than the third subset of wind turbines.

In yet another embodiment, the method may regulate a power ramp rate of the wind park, so the second subset of wind turbines are operated, on average, at 10%, preferably 20%, more preferably 30%, higher or equal power output than the fourth subset of wind turbines.

By lowering the power output on specific WTGs in the wind park and increasing it on other, may increase the total available ramping capacity for the wind park.

The following examples illustrates the technical effect of the method according to the present invention:

Example I

A wind park comprises 10 WTGs of 2 MW each; 20 MW in total for the wind park. In this example, the plant controller forwards power set points to the turbines, so as to control the power output of the turbines, by setting the rotor speed of the turbines. If the wind park reference is 4 MW the straight forward solution would be to derate all the WTGs to 20%:

=>2 MW*20%*10 units:4 MW park output

However, an embodiment of the present invention may setup the wind park with 5 WTGs operated at 30% power and 5 WTGs on 10% power:
=>2 MW*30%*5 units:3 MW
+
=>2 MW*10%*5 units:1 MW
4 MW park output The power output of the windfarm is maintained to have the same value with the setup according the invention. Since the 5 WTGs are operated with a higher power output they also have a higher ramp rate giving a higher overall ramp rate of the wind park.

The higher ramp rate may be due to the fact that, the energy in the rotor is significant higher when operating a 30% power compared to 20% power due to the higher speed–speed/angular velocity is effecting the rotor energy by the square root:

$$E_{rotational} = \tfrac{1}{2} * I * \omega^2$$

where I is the moment of inertia around the axis of rotation, $\omega$ is the angular velocity and $E_{rotational}$ is the kinetic energy.

Example II

In this example the wind park also comprises 10 WTGs of 2 MW each; 20 MW in total for the wind park. However, the inertia of the rotors is considered, which makes it possible to comparing the energy in the rotors of the turbines in the prior art solutions and a solution according to the invention. In the example the wind park reference is 4 MW. The moment of inertia (I) is not specified as it is the same for a given rotor as the turbines are considered to be identical. The rotational speed can be found by consulting the graph in FIG. 4. The straight forward solution would be to derate all the WTGs to 20%
=>20%*10×units: $E_{rotational} = 10 * \tfrac{1}{2} * I * 800^2 = 0.32 * 10e6$ I
Combined rotor energy for plant: 0.32*10e6 I However, an embodiment of the present invention may setup the wind park with 5 WTGs operated at 30% power and 5 WTGs on 10% power:
=>$P_{TM}$: 30%*5 units: $E_{rotational} = 10 * \tfrac{1}{2} * I * 1000^2 = 0.5 * 10e6$ I
+
=>$P_{TM}$: 10%*5 units: $E_{rotational} = 10 * \tfrac{1}{2} * I * 700^2 = 0.245 * 10e6$ I
Combined rotor energy for plant: 0.745*10e6 I Thus it can be seen that the rotational energy in the rotors are significantly higher by using the present invention in comprising with the prior art.

Figure 4:
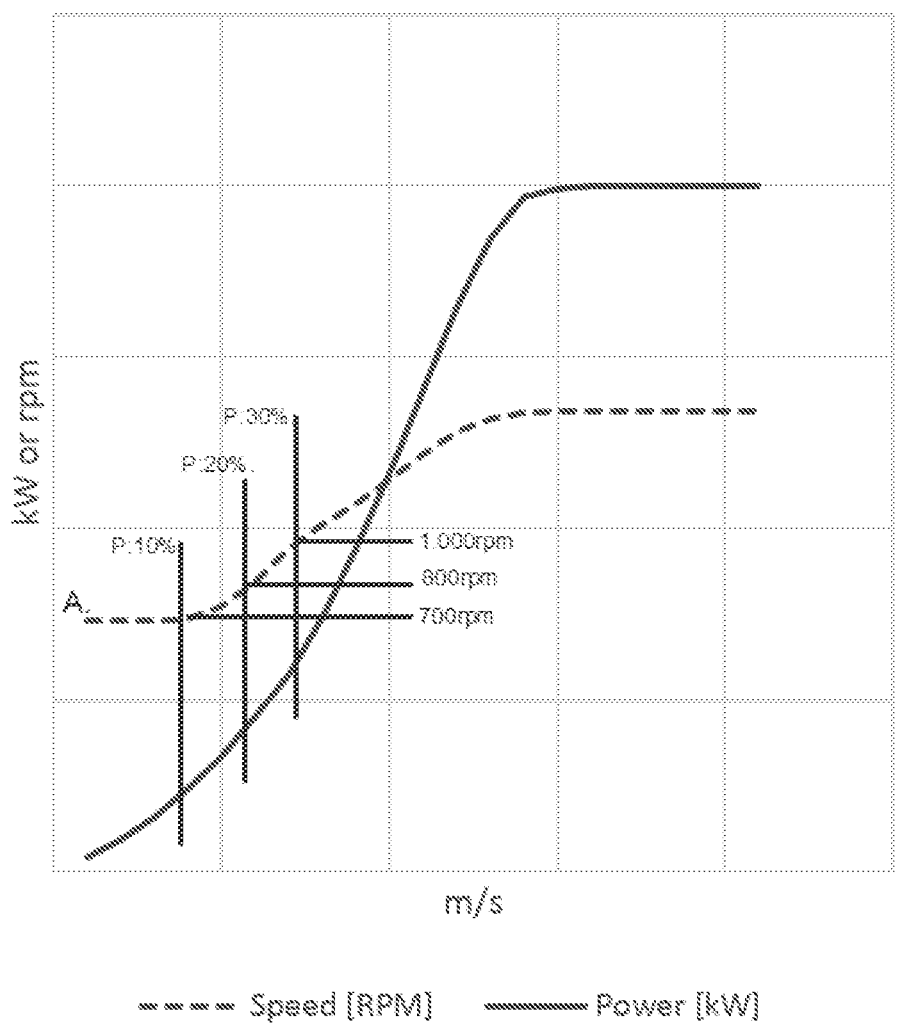
FIG. 4 an example of an power and speed curve for a WTG

FIG. 4 is shows an example of an power and speed curve for a WTG. It is to be understood that this is only one example and WTGs may have different power and speed curves. However, it is to be expected that WTGs have power and speed curves similar to the one shown in FIG. 4.

The method according to present invention may be implemented in the PPC software.

It is noted that the wind turbines should be adapted to handle the received power set-point PSP_i and regulate the power ramp accordingly. Thus, software for doing so should be present in the WTGs.

A power meter may be used to execute the power ramp calculation in order to obtain the power ramp measurements for the PPC. Implemented software in the PPC may be used to execute the power set-points PSP_i calculation and control algorithm and dispatching algorithm.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for regulating a power ramp rate of a wind park at a point of common coupling between the wind park and a utility grid, wherein the wind park comprises a plurality of wind turbines each having a power ramp rate dependent on a power output of the respective wind turbine, the method comprising:
receiving a power reference for the wind park;
determining the power ramp rate of the wind park as a function of a power output of each individual wind turbine or a power ramp rate of each individual wind turbine; and
in response to the power ramp rate of the wind park falling below a limit, (i) increasing a power output of a first wind turbine of the plurality of wind turbines such that a power ramp rate of the first wind turbine increases and (ii) de-rating or stopping a second wind turbine of the plurality of wind turbines such that a power ramp rate of the second wind turbine decreases, wherein after increasing the power output of the first wind turbine and de-rating or stopping the second wind turbine, a power output of the wind park meets the power reference and the power ramp rate of the wind park satisfies the limit.

2. The method for regulating the power ramp rate of the wind park according to claim 1, wherein, in response to the power ramp rate of the wind park falling below a limit:
a first subset of wind turbines within the plurality of wind turbines operate at a higher power output than a second subset of wind turbines within said plurality of wind turbines,
a third subset of wind turbines within the plurality of wind turbines operate at a lower power output than a fourth subset of wind turbines within said plurality of wind turbines, and
a fifth subset of wind turbines within the plurality of wind turbines are shut down.

3. The method for regulating the power ramp rate of the wind park according to claim 2, wherein the first subset of wind turbines are operated, on average, with at least 10% higher power output than the second subset of wind turbines.

4. The method for regulating the power ramp rate of the wind park according to claim 2, wherein the fourth subset of wind turbines are operated, on average, with at least 10% lower power output than the third subset of wind turbines.

5. The method for regulating the power ramp rate of the wind park according to claim 2, wherein the second subset of wind turbines are operated, on average, with at least 10% higher or equal power output than the fourth subset of wind turbines.

6. The method for regulating the power ramp rate of the wind park according to claim 1, wherein the determining of the power ramp rate of the wind park or the power ramp rates of the individual wind turbines at comprises measuring one or more of reactive power, active power, voltage, current, and power factor at a point of common coupling of the wind park or at an output terminal of each of the wind turbines.

7. The method for regulating the power ramp rate of the wind park according to claim 6, wherein the determined power ramp rate of the wind park or the power ramp rates of the individual wind turbines are based on an analysis of the measured voltage or current at the point of common coupling or at the output terminal of the wind turbines.

8. A wind park, comprising:
a plurality of wind turbines each having a power ramp rate dependent on a power output of the respective wind turbine; and
a power plant controller configured to perform an operation of regulating a power ramp rate at a point of common coupling between the wind park and a utility grid, the operation comprising:
receiving a power reference for the wind park;
determining the power ramp rate of at the point of common coupling as a function of a power output of each respective wind turbine or a power ramp rate of each individual wind turbine; and
in response to the power ramp rate of the wind park falling below a limit, (i) increasing a power output of a first wind turbine of the plurality of wind turbines such that a power ramp rate of the first wind turbine increases and (ii) de-rating or stopping a second wind turbine of the plurality of wind turbines such that a power ramp rate of the second wind turbine decreases, wherein after increasing the power output of the first wind turbine and de-rating or stopping the second wind turbine, a power output of the wind park meets the power reference and the power ramp rate of the wind park satisfies the limit.

9. The wind park of claim 8, wherein, in response to the power ramp rate of the wind park falling below a limit:
a first subset of wind turbines within the plurality of wind turbines operate at a higher power output than a second subset of wind turbines within the plurality of wind turbines;
a third subset of wind turbines within the plurality of wind turbines operate at a lower power output than a fourth subset of wind turbines within the plurality of wind turbines; and
a fifth subset of wind turbines within the plurality of wind turbines are shut down.

10. The wind park of claim 9, wherein the first subset of wind turbines are operated, on average, with at least 10% higher power output than the second subset of wind turbines.

11. The wind park of claim 9, wherein the fourth subset of wind turbines are operated, on average, with at least 10% lower power output than the third subset of wind turbines.

12. A controller, comprising:
an I/O interface;
a memory containing instructions; and
a processor configured to perform an operation for regulating a power ramp rate of a wind park at a point of common coupling between the wind park and a utility grid, wherein the wind park comprises a plurality of wind turbines each having a power ramp rate dependent on a power output of the respective wind turbine, the operation comprising:

receiving a power reference for the wind park;
determining the power ramp rate of the wind park as a function of the power output of each respective wind turbine or the power ramp rate of each individual wind turbine; and
in response to the power ramp rate of the wind park falling below a limit, (i) increasing a power output of a first wind turbine of the plurality of wind turbines such that a power ramp rate of the first wind turbine increases and (ii) de-rating or stopping a second wind turbine of the plurality of wind turbines such that a power ramp rate of the second wind turbine decreases, wherein after increasing the power output of the first wind turbine and de-rating or stopping the second wind turbine, a power output of the wind park meets the power reference and the power ramp rate of the wind park satisfies the limit.

\* \* \* \* \*